United States Patent [19]

Nishimura et al.

[11] Patent Number: 4,570,511
[45] Date of Patent: Feb. 18, 1986

[54] CONTROL SYSTEM FOR HYDRAULIC TRANSMISSION

[75] Inventors: Sadanori Nishimura; Masakazu Maezono, both of Saitama, Japan

[73] Assignee: Honda Giken Kogyo Kabushiki Kaisha, Tokyo, Japan

[21] Appl. No.: 434,570

[22] Filed: Oct. 15, 1982

[30] Foreign Application Priority Data

Oct. 17, 1981 [JP] Japan ............................ 56-164944
Nov. 6, 1981 [JP] Japan ............................ 56-177117

[51] Int. Cl.$^4$ ............................................ B60K 41/02
[52] U.S. Cl. ........................................ 74/867; 74/868; 74/877
[58] Field of Search .................. 74/862, 863, 867, 868, 74/877

[56] References Cited

U.S. PATENT DOCUMENTS

| | | | |
|---|---|---|---|
| 3,128,642 | 4/1964 | Fisher et al. | 74/752 |
| 3,167,970 | 2/1965 | Wagner et al. | 74/472 |
| 3,394,622 | 7/1968 | Chana | 74/867 |
| 3,650,161 | 3/1972 | Ito et al. | 74/866 |
| 3,710,638 | 1/1973 | Sakai | 74/867 X |
| 3,747,439 | 7/1973 | Uozumi et al. | 74/869 |
| 3,938,410 | 2/1976 | Dach et al. | 74/869 |
| 4,106,369 | 8/1978 | Taga | 74/869 |
| 4,145,937 | 3/1979 | Shindo et al. | 74/867 |
| 4,161,895 | 7/1979 | Ushijima et al. | 74/867 |
| 4,253,553 | 3/1981 | Yamada et al. | 192/3.62 |
| 4,274,308 | 6/1981 | Iwanaga et al. | 74/869 |
| 4,291,596 | 9/1981 | Sakakibara | 74/867 |
| 4,445,401 | 5/1984 | Ishimaru | 74/869 |

FOREIGN PATENT DOCUMENTS 2153907 10/1971 Fed. Rep. of Germany.
731653 6/1955 United Kingdom.
1324720 7/1973 United Kingdom.

Primary Examiner—Lawrence J. Staab
Assistant Examiner—Dwight G. Diehl
Attorney, Agent, or Firm—Lyon & Lyon

[57] ABSTRACT

A control system for a hydraulic transmission for a vehicle powered by an internal combustion engine has a low speed clutch and a high speed clutch, both actuated hydraulically. An oil draining line is connected to a low speed clutch when a control valve assembly is in its high speed position. The control valve assembly has an orifice and a drain oil control valve arranged in parallel. The valve is moved toward closed position when there is an increase in the throttle valve opening of the engine driving the hydraulic transmission. The drain oil control valve includes a valve having an intermediate throttling position between open and closed positions. The drain oil control valve is moved to its open position when oil pressure fed to the high speed clutch increases to a predetermined pressure, which pressure varies in response to the opening of the engine throttle valve.

6 Claims, 13 Drawing Figures

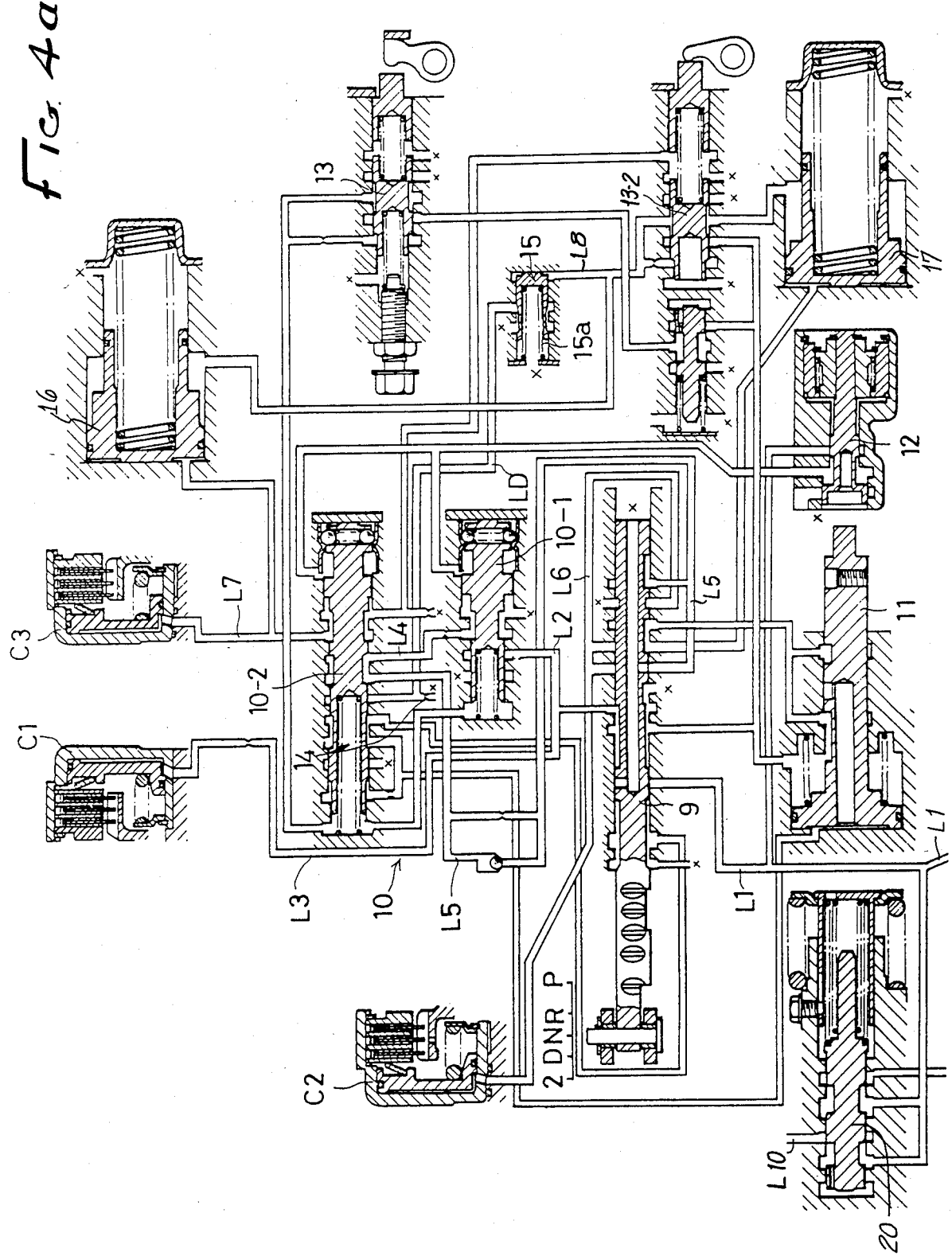

CONTROL SYSTEM FOR HYDRAULIC TRANSMISSION

This invention relates to a control system for a hydraulic transmission for a vehicle powered by an internal combustion engine. The control system is arranged so that pressurized oil is fed from a hydraulic pressure source through a control valve which may be moved between a lower speed position and a higher speed position. The pressurized oil is thus fed selectively to a lower speed hydraulic engaging element such as a clutch and a higher speed hydraulic engaging element, another clutch, which are each arranged for respective driving engagement with a lower speed transmission element and a higher speed transmission element, both provided in the hydraulic transmission.

A conventional system of this kind has an oil draining line for draining oil from a lower speed hydraulic engaging element when a shift valve is in its higher speed position. The oil draining line is provided with an orifice and a drain oil control valve arranged in parallel with the orifice and movable in its closing direction responsive to an increase in the opening of a throttle valve of the associated engine. The oil pressure acting upon the lower speed hydraulic engaging element has different pressure drop characteristics between the speed changing action at a larger throttle opening and that of a smaller throttle opening.

More specifically, in a relatively large throttle opening region, the engine output torque increases so that correspondingly higher hydraulic pressure is required for engagement of the higher speed hydraulic engaging element, which results in retarded engagement of the same hydraulic engaging element during speed changing operation. In this large throttle opening region, the drain oil control valve is moved toward its closing position to increase its own resistance to passage of the drain oil from the lower speed hydraulic engaging element. Accordingly, the oil pressure acting upon the lower speed hydraulic engaging element has a relatively slow drop to retard the disengagement of the same hydraulic engaging element, resulting in longer concurrent engagement of the two hydraulic engaging elements for prevention of a sudden increase in the engine speed. On the other hand, in a relatively small throttle opening region, the engine output torque decreases so that correspondingly reduced hydraulic pressure becomes required for engagement of the higher speed hydraulic engaging element to accelerate the engaging action of the higher speed hydraulic clutch during a speed changing operation. In this small throttle opening region, the drain oil control valve is moved towards its opening position to decrease its own resistance to passage of the drain oil so that the oil pressure acting upon the lower speed hydraulic engaging element has a relatively abrupt drop to accelerate the disengagement of the latter. This results in a shortened period of concurrent engagement of the two hydraulic engaging elements for prevention of stalling of the engine which is generally called "engine brake". However, according to the above arrangement, even when the engaging pressure for the higher speed hydraulic engaging element is increased to a required value, the lower speed hydraulic engaging element is not released from its engagement concurrently with the engagement of the higher speed hydraulic engaging element. That is, relativly large "trailing" torque is produced due to residual pressure in the lower speed hydraulic engaging element so that the engine can easily undergo engine brake action.

The object of the present invention is to provide a control system of this kind which is free of the above-mentioned disadvantage, and the invention provides a control system for a hydraulic transmission, in which pressurized oil is fed from a hydraulic pressure source through a control valve changeable in position between a lower speed position and a higher speed position. The pressurized oil is thus fed selectively to a lower speed hydraulic engaging element and a higher speed hydraulic engaging element which are arranged for respective driving engagement with a lower speed transmission element and a higher speed transmission element. An oil draining line is arranged for connection with the lower speed hydraulic engaging element when the control valve is in its higher speed position, and which is provided with an orifice and a drain oil control valve arranged in parallel with the orifice and movable in its closing direction responsive to an increase in the throttle opening of the engine. The control system is characterized in that the drain oil control valve comprises a variable-opening orifice type valve which is arranged to be returned to its open position when the oil feeding pressure to the higher speed hydraulic engaging element is increased up to a predetermined pressure variable in accordance with the throttle opening.

Other objects and advantages will appear hereinafter.

In the drawings:

FIG. 4a is the upper portion of a view showing an oil hydraulic circuit according to one embodiment of the present invention. FIG. 4b constitutes the lower portion of FIG. 4a.

Figure 1:
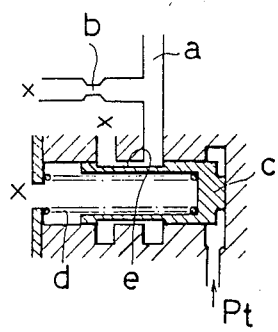
FIG. 1 is a sectional detail showing a conventional shift valve.

Referring to the drawings, and particularly FIG. 1, a conventional control system has hydraulic engaging elements which are disposed for engagement with transmission elements (gears) and are arranged for selective connection through the action of a shift valve which communicates with an oil feeding line and an oil draining line. The oil draining line "a" is provided with an orifice "b" and a control valve "c" arranged in parallel with the orifice and responsive to throttle pressure $P_t$ from the throttle valve of the engine. The oil pressure acting upon one of the hydraulic engaging elements connected to the oil draining line "a" has different pressure drop characteristics between the speed changing action at a large throttle opening compared to that at a small throttle opening, as mentioned in the Fisher et al U.S. Pat. No. 3,128,642.

Figure 9:
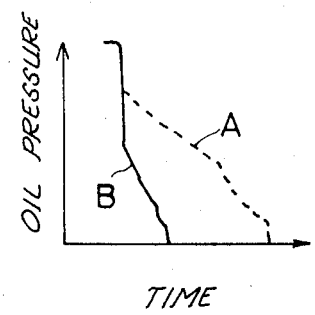
FIG. 9 is a graph showing the pressure drop characteristics of an hydraulic engaging element.

More specifically, the control valve "c" is movable to open position by the force of a spring "d" and toward closed position by throttle pressure $P_t$ corresponding to the throttle opening. In a relatively large throttle opening region when the engine provides large output torque, the throttle pressure Pt increases to cause the control valve "c" to close, and as a consequence the oil draining line "a" has its flow resistance correspondingly increased so that the oil pressure acting upon the hydraulic engaging element in the draining position drops as approximately indicated by the dashed line A in FIG. 9. This results in long concurrent engagement of the same element and the other one in the oil feeding position to prevent rapid speed increase of the engine. On the other hand, in a relatively small throttle opening region with small engine output torque, the control valve "c" is opened by the force of the spring "d" due to reduced throttle pressure $P_t$, to cause a decrease in the flow resistance of the oil draining line "a". This results in a relatively abrupt drop of the oil pressure as indicated by the dashed line B in FIG. 9. This leads to a shortened period of the concurrent engagement of the hydraulic engaging elements for prevention of stalling of the engine.

Figure 2:
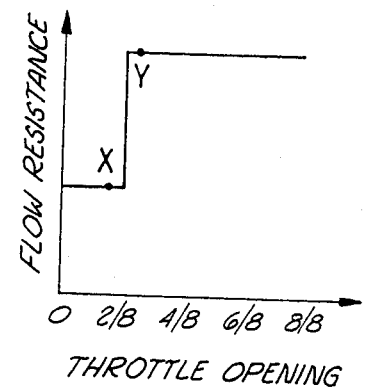
FIG. 2 is a graph showing the variable flow resistance characteristic of the device of FIG. 1.
Figure 3:
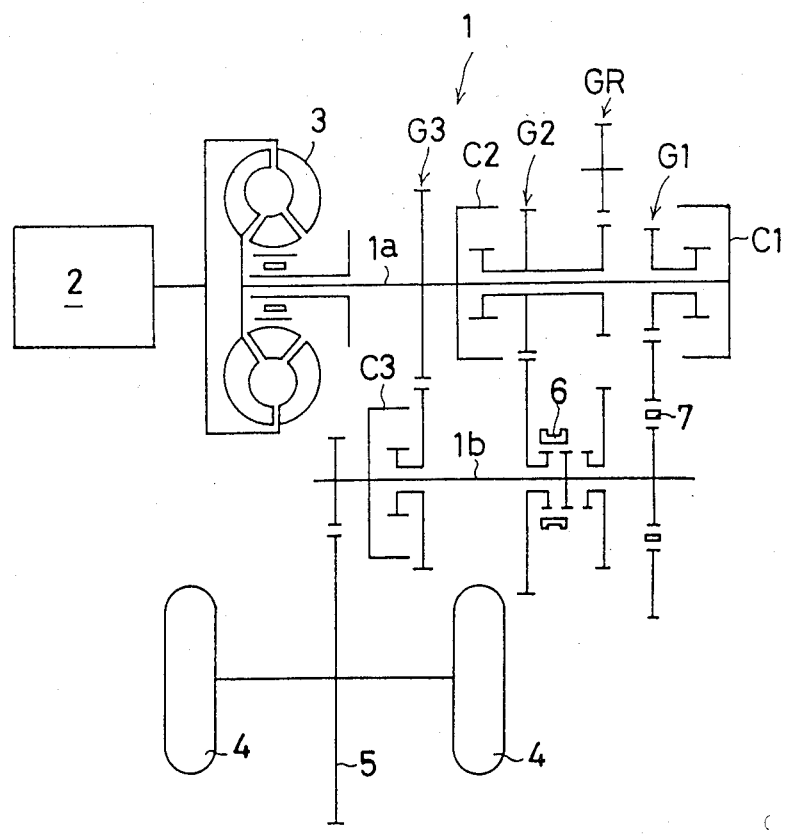
FIG. 3 is a schematic view of the transmission to which the device of the present invention is applicable.
Figure 6:
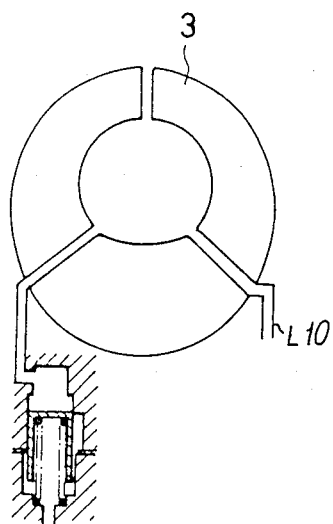
FIG. 6 is a graph showing the variable flow resistance characteristic of the device of FIG. 5.
Figure 6:
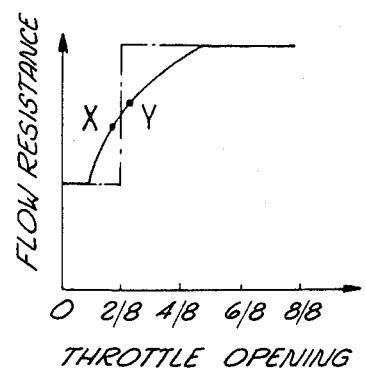

However, usually the control valve "c" is a type in which the valve body is provided with a groove or channel "e" and is therefore adapted to select only two position, open and closed. That is, the valve "c" does not provide any throttle effect during an intermediate portion of its position changing stroke, so that at a predetermined small throttle opening at which the control valve is moved to its open or closed position changing point, the flow resistance in the oil draining line "a" changes abruptly as shown in FIG. 2. As a consequence, there is a large difference in the pressure drop characteristic of the hydraulic engaging elements concerned between one throttle opening side X and the opposite one Y with respect to the above predetermined throttle opening, although the engine output does not vary significantly between the two throttle opening sides X and Y. Therefore, while at one of the throttle opening sides X and Y the engine can undergo a sudden speed increase, it can undergo stalling at the other side. These phenomena depend on the configuration of the oil draining line "a", such as the inner diameter of the orifice "b". It is thus difficult for the conventional arrangement to control the concurrent engagement of the hydraulic engaging elements at throttle openings in the vicinity of a predetermined throttle opening.

The transmission 1 comprises an input shaft 1a for coupling an engine 2 to an output shaft 1b through a torque converter 3. The shaft 1b turns driven gear 5 and driving wheels 4 of a vehicle equipped with the engine 2. 1st, 2nd and 3rd speed forward gears G1, G2 and G3, and a reverse gear GR are provided. Hydraulic clutches C1, C2 and C3, which form the hydraulic engaging elements, are disposed for driving engagement with the forward gears G1, G2 and G3, respectively. The reverse gear GR is disposed for driving engagement with the 2nd speed hydraulic clutch C2 in a manner alternating with the 2nd speed forward gear G2. The 2nd speed hydraulic clutch C2 can engage selectively with the two gears G2 and GR through the action of a selector gear 6 mounted on the output shaft 1b. Reference numeral 7 designates a one-way clutch disposed for driving engagement with the 1st speed forward gear G1, for permitting overspeed rotation of the output shaft 1b.

Figure 4B:
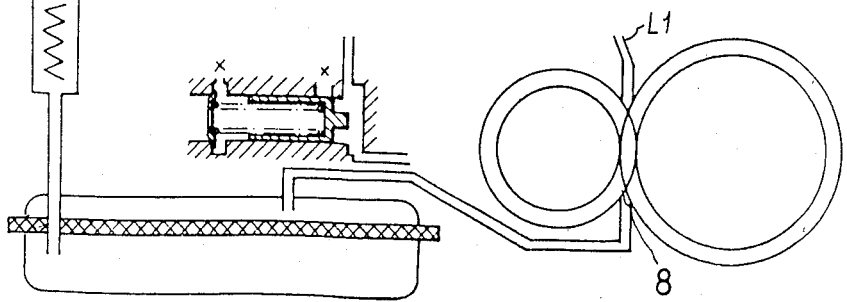

The hydraulic clutches C1, C2 and C3 can be controlled by an oil hydraulic circuit as shown in FIGS. 4a and 4b. The oil hydraulic circuit in FIGS. 4a and 4b comprises a hydraulic oil source 8, a manually operated valve 9 disposed for selectively assuming a parking position P, a reverse position R, a neutral position N, an automatic transmission position D and a 2nd speed keeping position 2. The line L10 connects the torque converter 3 to the valve 20. A shift valve assembly 10 is selectively changeable in position in response to the vehicle speed and the throttle opening, and a servo valve 11 is disposed for coupling to the selector gear 6 for selecting forward and reverse position. When the manually operated valve 9 assumes the position D, a first oil line L1 for feeding oil from the hydraulic oil source 8 is connected to a second oil line L2 leading to the shift valve assembly 10, so that oil feeding takes place to the 2nd or 3rd speed clutch C2 and C3 through the shift valve assembly 10.

The 1st speed hydraulic clutch C1 is arranged to be continuously supplied with pressurized oil through a third oil line L3 branching from the second oil line L2. In the speed changing operation between 1st speed and 2nd, the engaging force of the 2nd speed hydraulic clutch C2 gradually increases as the oil pressure increases. When the rotation speed of the output shaft 1b increases with torque transmission through the 2nd transmission gear G2, up to a value exceeding rotational speed of the shaft 1b achieved by torque transmission through the 1st speed gear G1, thus avoiding speed changeover shock. However, the changeover shock is not negligible in the speed change between 2nd speed and 3rd speed, wherein changeover from the 2nd speed hydraulic clutch C2 to the 3rd speed hydraulic clutch C3 is effected through the action of the shift valve assembly 10. Detailed explanation will now be made in this respect. The shift valve assembly 10 comprises a first valve 10-1 arranged at a relatively upstream location for effecting speed change between 1st speed and 2nd speed, and a second valve 10-2 arranged at a relatively downstream location for effecting speed change between 2nd speed and 3rd speed. The two valves 10-1 and 10-2 are connected to each other through an intermediate fourth oil line L4. The valves 10-1 and 10-2 are each disposed to have its right end acted upon by governor pressure corresponding to the vehicle speed and supplied from a governor 12, and its left end acted upon by throttle pressure corresponding to the throttle opening and supplied from the first throttle valve 13. With an increase in vehicle speed, first the valve 10-1 is moved from its right or 1st speed position to its left or 2nd speed position. This connects the second oil line L2 to a fifth oil line L5 leading from the outlet side of valve 10-2, through the fourth oil line L4. On this occasion, when the manually operated valve 9 is in the position D, oil feeding from the hydraulic pressure source 8 takes place to the 2nd speed hydraulic clutch C2. This occurs through a sixth oil line L6 which is arranged for connection with the fifth oil line L5 with the valve 9 in the position D, thus effecting changeover from 1st speed to 2nd speed.

With a further increase in vehicle speed, the shift valve 10-2 is displaced from its right or 2nd speed position to its left or 3rd speed position. This causes changeover from the connection of the fourth oil line L4 with a fifth oil line L5 to connection of the line L4 with a seventh oil line L7 leading to the 3rd speed hydraulic clutch C3. This produces simultaneous connection of the fifth oil line L5 to the oil draining line LD whereby oil drains from the 2nd speed hydraulic clutch C2, and oil feeding takes place to the 3rd speed hydraulic clutch C3, thus effecting changeover from 2nd speed to 3rd speed. The oil draining line LD is provided with an orifice 14 and a control valve 15 arranged in parallel with the orifice 14, and the control valve 15 is moved toward its closed position with an increase in the throttle opening. These two members 14 and 15 serve to provide a difference in the descending slope of the oil pressure or 2nd speed oil pressure acting upon the 2nd hydraulic clutch C2, depending upon the throttle opening during changeover between 2nd speed and 3rd speed.

In the illustrated embodiment of FIG. 4a, the preferred embodiment of this invention, an accumulator 16 is connected to the seventh oil line L7 leading to the 3rd speed hydraulic clutch C3, for attenuating or damping changes in the 3rd speed oil pressure. This accumulator 16 is supplied with throttle pressure from a second throttle valve 13-2, acting upon the accumulator 16 as backpressure, so that with an increase in the engaging pressure of the 3rd speed hydraulic clutch C3 corresponding to an increase in the throttle opening, the accumulator 16 can perform its damping function under higher pressure.

In FIG. 4a, reference numeral 17 designates another accumulator which is arranged for connection with the 2nd speed hydraulic clutch C2 when the manually operated valve 9 assumes its position D, and which is also supplied with the throttle pressure from the second throttle valve 13-2 in the same manner as the accumulator 16. According to the present invention, the drain oil control valve 15 is returned to its open position by the spring 15a almost concurrently with increasing of the oil feeding pressure to the 3rd speed hydraulic clutch C3 up to a predetermined pressure preset at a value corresponding to the throttle opening.

Figure 5:
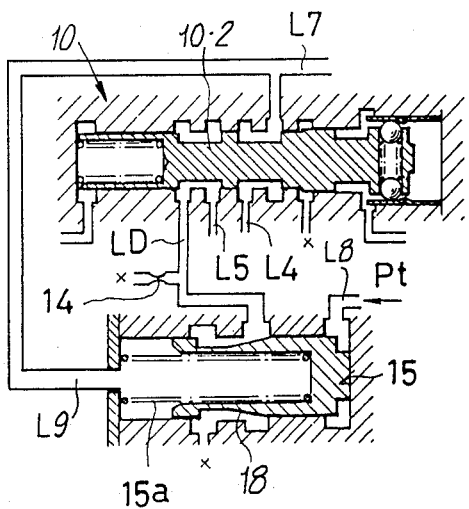
FIG. 5 is an enlarged sectional view of an essential part of the device shown in FIG. 4a showing a modification thereof.
Figure 7:
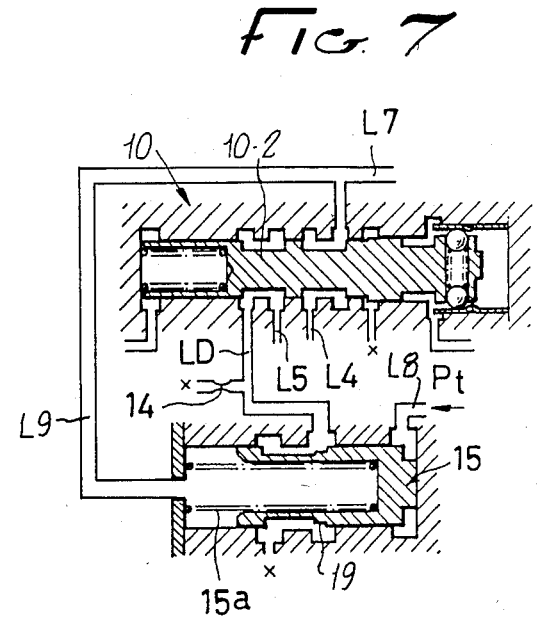
FIG. 7 is a sectional view similar to FIG. 5 of an essential part of another embodiment of the present invention.
Figure 8:
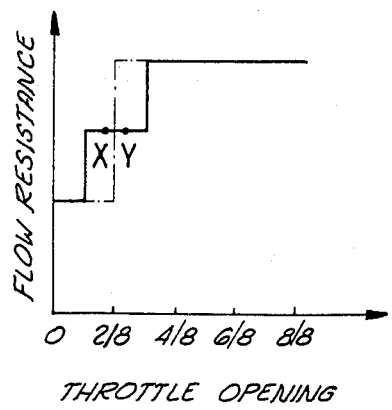
FIG. 8 is a graph showing the variable flow resistance characteristic of the device of FIG. 7.
Figure 10:
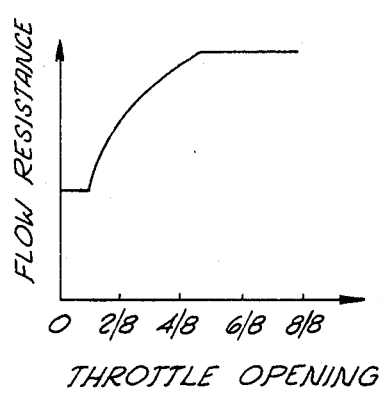
FIG. 10 is a diagram showing the throttling effect produced by the valve 15 of FIG. 5.
Figure 11:
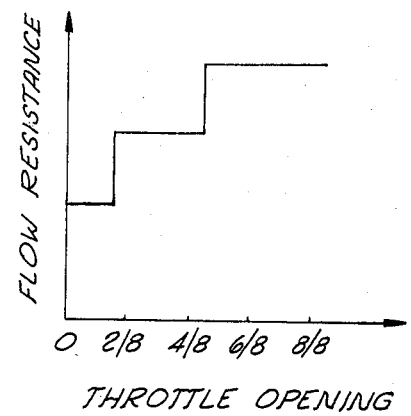
FIG. 11 is a diagram showing the throttling effect of the valve 15 shown in FIG. 7.

As best shown in FIG. 5, the drain oil control valve 15 is disposed to have its right end acted upon by throttle pressure supplied from the second throttle valve 13-2 through an eighth oil line L8 to be urged toward its closed position against the force of a spring 15a. The left end of the drain oil control valve 15 is disposed also to be acted upon by oil pressure being fed to the 3rd speed hydraulic clutch C3, through a ninth oil line L9 branching from the seventh oil line L7 which differs from the embodiment of FIG. 4 wherein only the spring 15a urges the valve piston toward the open position. Further, the drain oil control valve 15 of FIGS. 4a and 5 is a variable opening orifice type having a throttling intermediate position. That is, the valve 15 has an annular peripheral groove formed with a sloping portion 18 having a tapered surface as shown in FIG. 5. Alternatively, the annular peripheral groove may be formed as a stepped portion 19 as shown in FIG. 7. With these contructions the throttling effect produced by the valve 15 has a gradually changing characteristic as shown in FIG. 10, and the throttling effect produced by the valve 15 in FIG. 7 is shown in FIG. 11.

Figure 12:
FIG. 12 is a graph showing pressure change characteristics obtained during changeover between 2nd speed and 3rd speed.
Figure 12:
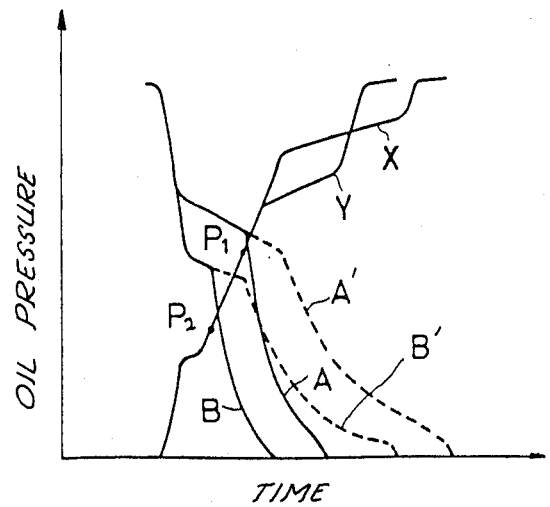

FIG. 12 shows characteristic changes in the 2nd speed pressure and the 3rd speed pressure obtained during changeover between 2nd speed and 3rd speed. With the drain oil control valve 15 and system of FIG. 4a, the 2nd speed pressure drops along a curve variable in response to the throttle opening. For example, it drops along the line A' when the throttle opening has a medium value such as ⅝, and along the line B' when the throttle opening has a small value such as 2/8, whereas the 3rd speed pressure increases along the line X at a medium throttle opening, and along the line Y at a small throttle opening, to a pressure region where the accumulator 16 can effect its damping action. It is noted from the graph that even after completion of the engagement of the 3rd speed hydraulic clutch C3, the 2nd speed pressure still remains high, resulting in an unnecessarily long period of concurrent engagement of the 2nd speed hydraulic clutch C2 and the 3rd speed hydraulic clutch C3, which can lead to engine braking action.

On the other hand, in the illustrated embodiment of FIG. 5 according to the present invention, with an increase in the 3rd speed pressure, the drain oil control valve 15 is moved toward open position. When the 3rd speed pressure is a predetermined pressure, the control valve 15 is brought into its fully open position, causing a sudden drop in the 2nd speed pressure.

The predetermined pressure for the 3rd speed pressure is chosen in relation to the throttle pressure urging the valve 15 in its closing direction. Therefore this predetermined pressure is variable in response to the throttle opening. For instance, the 2nd speed pressure suddenly drops concurrently or almost in synchronism with increasing of the 3rd speed pressure to relatively high pressure $P_1$. This occurs in a rapidly increasing region, at a medium throttle opening, and concurrently or almost in synchronism with increasing of the 3rd speed pressure at a relatively lower pressure $P_2$ at a smaller throttle opening. The pressure drop characteristics of the embodiment of FIG. 5 as indicated by the lines A and B in FIG. 12. The graph shows that at either of the small or medium throttle openings, an unnecessarily long period of concurrent engagements of the 2nd and 3rd hydraulic clutches can be prevented, which would otherwise be caused by residual 2nd speed pressure after increasing of the 3rd speed pressure to the damping pressure region.

Further, it is to be noted that the sudden drop of the 2nd speed pressure takes place only when or after the 3rd speed pressure has increased to a higher predetermined pressure corresponding to an increase in the throttle opening, thus preventing a sudden increase in the engine speed.

Although in the embodiment of the invention as described above, details of the changeover between 2nd speed and 3rd speed are spelled out, it is to be understood that this is by way of illustration and not a limitation.

As described above according to the invention, the drain oil control valve is of the variable opening orifice type and is adapted to be returned to its opening position when the oil feeding pressure to the higher speed hydraulic engaging element is increased. The increase occurs up to a predetermined pressure variable in relation to the throttle opening, and the control valve has an intermediate throttle position. The oil pressure acting upon the lower speed hydraulic engaging element is arranged to drop suddenly almost in synchronism with increasing of the oil feeding pressure to the higher speed hydraulic engaging element up to said predetermined pressure. This prevents increase in the engine speed as well as an unnecessarily long period of concurrent engagement of the lower and higher speed hydraulic engaging elements, after engagement of the higher speed hydraulic element. Therefore, the control system according to the invention is substantially free of the conventional disadvantage previously noted, permitting smooth control of the hydraulic transmission.

Having fully described our invention, it is to be understood that we are not to be limited to the details herein set forth but that our invention is of the full scope of the appended claims.

We claim:

1. In a control system for a hydraulic transmission for a vehicle powered by an internal combustion engine having an air intake controlled by a throttle valve, the transmission having hydraulic engaging elements, the improvement comprising, in combination: an oil draining line adapted for connection to at least one of said hydraulic engaging elements, said oil draining line having an orifice and a control valve assembly arranged in parallel with said orifice, said control valve assembly including a valve means movable between open and closed positions, means for urging said valve means toward said closed position during shifting between hydraulic engaging elements solely with a force which increases directly proportional to increased engine throttle valve opening, means for urging said valve means to return to said open position during the completion of the shifting of the hydraulic engaging elements, and said valve means having a shape for providing a throttled rate of oil flow through said control valve assembly in an intermediate position between said open and closed positions for throttling the oil flow as said valve means moves between said open and closed positions.

2. The control system of claim 1 wherein said valve means includes a piston means having two ends and the said means for urging said valve means toward said closed position comprising oil pressure related to the throttle valve opening imposed on one said end of the piston means, and the said means for urging said valve means to return to said open position comprising oil pressure from one of said hydraulic engaging elements imposed on the other said end of the piston means.

3. The control system of claim 1 wherein said valve means shape produces a progressive, variable throttling of the rate of oil flow.

4. The control system of claim 1 wherein said valve means shape produces an abrupt change in oil flow rate to an intermediate rate.

5. In a control system for a hydraulic transmission for a vehicle powered by an internal combustion engine having an air intake controlled by a throttle valve, the improvement comprising, in combination: a lower speed hydraulic engaging element for driving engagement with a lower speed transmission element, a higher speed hydraulic engaging element for driving engagement with a higher speed transmission element, a control valve assembly movable between a lower speed position and a higher speed position, an oil draining line connected to the lower speed hydraulic engaging element when the control valve assembly is in its higher speed position, said control valve assembly being provided with an orifice and a drain oil control valve arranged in parallel with said orifice, said drain oil control valve being movable toward closed position with an increase in the throttle valve opening during shifting between said lower speed hydraulic engaging element and said higher speed hydraulic engaging element, said drain oil control valve having a shape for throttling the rate of oil flow therepassed in an intermediate throttling position between open and closed positions, and means for causing said drain oil control valve to be moved to its open position when oil pressure fed to said higher speed hydraulic engaging element increases to a predetermined pressure which varies in response to the opening of said throttle valve.

6. The control system of claim 5 wherein said drain oil control valve includes a piston means having two ends with oil pressure related to the throttle valve opening imposed on one said end for urging the piston toward the closed position and the said oil pressure fed to the higher speed hydraulic engaging element imposed on the other said end.

* * * * *